United States Patent Office 3,505,169
Patented Apr. 7, 1970

3,505,169
RECONSTITUTED LEATHER AND METHOD
FOR PRODUCING IT
Edward T. Parker, Wayne, Mich., assignor to Wyandotte Chemicals Corporation, Wyandotte, Mich., a corporation of Michigan
No Drawing. Filed Dec. 5, 1966, Ser. No. 598,910
Int. Cl. D21f *11/00;* D21h *5/12*
U.S. Cl. 162—151                                    11 Claims

ABSTRACT OF THE DISCLOSURE

Shredded scrap leather fibers, with or without unbleached kraft pulp, are bound together by polyurethane polymeric solids deposited from an aqueous solution. The polymeric solids are formed by chain extending an isocyanate-terminated prepolymer in water to form a latex. The reconstituted leather sheets are made by mixing shredded scrap leather fibers (with or without unbleached kraft pulp), a polymeric latex, and water to obtain a slurry; feeding the slurry onto a porous membrane; drying; and curing, whereby novel reconstituted leather is produced.

---

This invention relates to a novel reconstituted leather having both the hand or feel of natural leather and the water vapor transmission or breathability of leather.

A good leather substitute should have several basic qualities: (1) a hand like that of leather, (2) a breathability of leather, (3) a good tear strength or resistance to tearing, and (4) an exposed surface having no visible pores.

There have been many attempts recorded in the prior art to produce suitable leather substitutes. Some of the prior art processes are disclosed in U.S. Patents 3,000,757, 3,066,997, 3,100,773, and 3,169,885.

None of these prior art attempts have been successful in producing a leather substitute that has all of the good properties of natural leather.

It is an object of this invention to prepare reconstituted leather. It is another object to prepare reconstituted leather that has the feel, the flexibility, the abrasion resistance, the moisture absorption, and the moisture vapor transmission rate approaching that of natural leather.

While many methods have been suggested for making synthetic leathers, such methods have not been without their limitations. It has often been necessary to employ costly materials and cumbersome methods to achieve the synthetic leathers of the prior art. Attempts to simulate the structures and properties of leather have never been entirely successful.

It has now been discovered that polymeric solid particles deposited from polymeric latices can be used as binders for shredded scrap leather fibers to produce material closely resembling natural leather, but with superior abrasion resistance and flexibility properties. Unbleached kraft pulp may also be included in the formulation where a higher tear strength is required. The sheets of polymeric solid bound scrap leather may then be further coated to produce materials having superior properties. These materials have a good leather-like hand, a good drape, and when coated with a latex coating show abrasion characteristics superior to natural leather. Various latices, as hereinafter described, can be used with different effects on the strengths and physical properties of the synthetic material.

Broadly speaking, the novel leather substitutes of this invention comprise shredded leather fibers bonded together with discrete polyurethane particles which have been separated from a polyurethane latex. The polyurethane particles, when deposited from the aqueous latex solution, form a plastomeric or elastomeric integrated network in which the shredded scrap leather fibers are held. By blending various types of polyurethane latices, the physical properties of the scrap leather bound with the polymeric solids may be custom made to accommodate the desired end use of the reconstituted leather sheet.

In general, the reconstituted leather of this invention is made by first diluting a required amount of polyurethane latex with water. The requisite amount of shredded scrap leather fiber is then added stepwise to the latex mixture with agitation. As the solids content of the mixture increases, the speed of the agitation is increased. The mixture should have a solids content at this point of from about 5% to 10% by weight, based on total weight of the mixture of shredded scrap leather fiber, latex solids, and water, with from 7% to 8% by weight preferred. Agitation is continued until as near a homogenous mixture as possible is obtained. The mixture of latex and shredded scrap leather fiber is then further diluted with water to a solids content of from about 1.5% to 4.0% by weight, with from 2% to 3% by weight being preferred. This final solids content will be determined by the particular method and machinery used to make the polymeric solid bound leather sheets. The dilute slurry of polyurethane latex and shredded scrap leather fiber is now ready to be formed into polymeric solid bound leather sheets. Conventional paper making equipment may be suitably used for the production of the reconstituted leather from the dilute slurry. For example, the slurry is fed onto a porous membrane such as a screen or felt in the same general manner as paper is made, e.g., in a papermaker's box (sheet mold) or on a Fourdrinier machine. The polymeric solid bound leather sheets are pressed to remove excess liquid, air dried at 100° to 150° F., and finally cured at about 200° to 250° C. for 20 to 50 minutes to give the novel leather substitute.

It is sometimes desirable to add a coalescent or a coalescing agent to the polymeric latex-shredded leather fiber-water slurry just before feeding the slurry to the porous membrane. These coalescing agents are organic compounds in which the polymeric solid particles are partially soluble and, therefore, act as swelling agents. The inclusion of the coalescing agent in the slurry aids in the reconstituted leather sheet formation by causing the solid polymeric particles to deposit out of the slurry in a more uniform pattern and adhere together in a more or less continuous integrated network of the individual particles. Any organic compound that acts as a partial solvent or swelling agent for the solid polymeric particles may be used. The preferred partial solvents-coalescing agents include 2-pyrrolidone, N-methyl-2-pyrrolidone, N-vinyl-2-pyrrolidone, toluene, and xylene with 2-pyrrolidone being especially preferred.

Other materials may also be incorporated into the reconstituted leather sheets to improve the properties thereof. Unbleached kraft pulp may be added to the formulation to increase the tear resistance of the shredded scrap leather fibers bound with polymeric solids. Kraft pulps are generally made from long-fibered softwoods and are used for their outstanding toughness, strength, and durability. The kraft pulp consists of fibers that help make a bulky sheet which bends easily without cracking or piping and which absorbs the polymeric latex quickly.

A simplified flow diagram of the process of this invention is:

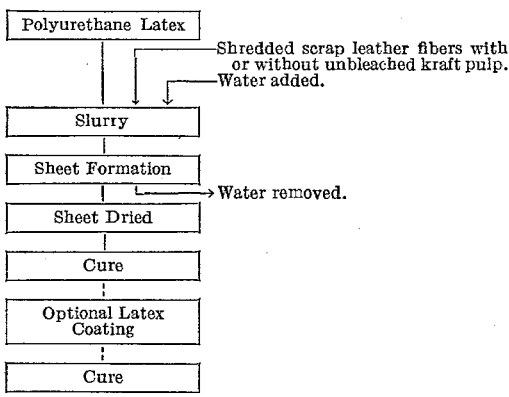

The cured polymeric solid bound scrap leather sheets comprise from about 35% to 70% shredded scrap leather fibers and from about 65% to 30% polyurethane polymeric solids, based on the total weight of the shredded scrap leather fibers and the polymeric solids. The polymeric solid bound leather sheets preferably contain from about 45% to 65% by weight shredded scrap leather fibers.

When unbleached kraft pulp is included in the formulation, the cured reconstituted leather sheets comprise from about 10% to 30% unbleached kraft pulp, from about 20% to 40% shredded scrap leather fibers, and from about 30% to 65% polyurethane polymeric solids.

The cured reconstituted leather sheet may then be further coated with the same polymeric material or others, depending upon the desired surface characteristics of the sheet being produced. The coated sheets will be cured at specific times and temperatures, in accordance with the coating material used thereon. In general, the coatings may be cured at 200° to 250° C. for about 15 to 45 minutes. It is also contemplated that the polymeric solid bound leather sheets will be used without further coating for certain applications.

Any of a number of polyurethane latices may be used to bind the shredded scrap leather fibers with or without the unbleached kraft pulp. The polyurethane latices, sometimes referred to as emulsions, are made by the chain extension of prepolymers or addition products formed from high molecular weight organic compounds having terminal active hydrogens and organic diisocyanates while the prepolymer or addition products are dispersed in an aqueous medium. Accordingly, high molecular weight prepolymers are initially produced by reacting an organic compound having at least two active hydrogen atoms and having a molecular weight of at least 300 with a stoichiometric excess of an organic diisocyanate. The addition product or prepolymer, which is generally in the form of a syrupy liquid, is then emulsified in water or an aqueous solution of a chain-extending agent of the class more particularly identified hereinafter. If the initial addition product is too thick or viscose to emulsify properly in water, it can be diluted with an inert solvent and the resulting solution emulsified in the aqueous bath. Whether or not a solvent is used, an emulsifying agent is employed. The emulsifying agent may be added either to the initial addition product or to the water in which the addition product is to be emulsified, or may be formed in situ during addition of the addition product to the water.

Any organic compound containing at least two active hydrogen atoms may be reacted with a stoichiometric excess of an organic polyisocyanate to give a prepolymer or an initial addition product. The prepolymer or initial addition product is then capable of a molecular weight increase through chain extension with water, an organic primary diamine, or other chain-extending agents according to the general process of chain-extending polymers.

Active hydrogen-containing compounds which may be used in preparing the polyurethane latex include the polyalkylene ether polyols, the poly(alkylene ether-alkylene thioether) polyols, polyalkylene esters of alkylene diacids, polyalkylne esters of arylene diacids, esters of polyhydric alcohols and hydroxy fatty acids, alkyl resins containing hydroxyl or carboxyl end groups, and polyester amide resins. The term "active hydrogen atoms" refers to hydrogens which, because of their position in the molecule, display activity according to the Zerewitinoff test as described by Kohler in J. Am. Chem. Soc., 49, 3181 (1927). Linear compounds containing hydrocarbon groups linked together by ether or ester linkages and having terminal hydroxyl groups are the preferred representatives of this type of compound.

A particularly useful class of active hydrogen-containing compounds for this purpose is the polyalkylene ether polyols which have the general formula $H(OR)_nOH$ where R is an alkylene radical and $n$ is an integer sufficiently large that the compound as a whole has a molecular weight of at least 300. Molecular weights of up to 10,000 are satisfactory, the preferred range being from about 750 to 4,000. Polyethylene ether glycols, poly-1,2-propylene ether glycols, polytetramethylene ether glycol, poly-1,2-dimethylene ether glycol, and polydecamethylene ether glycols are typical members of this class.

The poly(alkylene ether-alkylene thioether) polyols that may be used within the scope of this invention are more fully described in U.S. Patent 2,900,386. These compounds resemble the polyalkylene ether polyols except that some of the alkylene radicals are joined by sulphur rather than oxygen. In each case, these compounds have terminal hydroxy groups, which take part in the reaction with the organic diisocyanate.

The alkyl resin polyesters may also be used as the high molecular weight active hydrogen-containing organic compound. These are formed by the reaction between polyols, such as ethylene glycol, diethylene glycol, triethylene glycol, trimethylene glycol, pentamethylene glycol, hexamethylene glycol, decamethylene glycol, and the like, with dibasic acids, such as malonic, succinic, glutaric, adipic, phthalic, terephthalic, hexahydroterephthalic, and para-phenylenediacetic acids. The process is also applicable to other alkyl resins formed using glycerine or other polyhydroxy compounds with dibasic acids, as well as to esters of polyhydric alcohols and hydroxy fatty acids, such as glycerine, ricinoleate, and castor oil. Another useful group of compounds for this purpose are the polyester amide resins described in U.S. Patent No. 2,424,883.

In addition to the high molecular weight active hydrogen-containing compounds, there may also be used smaller amounts of low molecular weight compounds such as polyalkylene ether diols, which have a modifying effect on the properties of the ultimate elastomer or plastic. When it is desired to improve the tensile and tear strength of the polymers prepared from the latices disclosed herein, diols may be employed along with the polyols in the preparation of the latices.

It is contemplated that compounds having three or more active hydrogen atoms may also be employed in the preparation of the polyurethane latices. These polyalkylene ether polyols result from the reaction of an alkylene oxide and a compound having at least three active hydrogen atoms. These polyols should have a molecular weight of at least about 1,500. Alkylene oxides which may be employed in the preparation of these polyalkylene ether polyols are those oxides which have at least three carbon atoms, such as propylene oxide, butylene oxide, styrene oxide, epichlorohydrin, tetrahydrofuran, and cyclohexene oxdie. Mixtures of any of the above may also be used. In addition, the above oxides may be used in combination with ethylene oxide. The amount of ethylene oxide in the mixture may vary considerably, depending upon the particular higher alkylene oxide used in conjunction therewith. In no instance, however, will the amount of ethylene oxide be greater than 50% by weight, based on the total weight of the alkylene oxide mixture.

Compounds having at least three active hydrogen atoms which may be employed in the preparation of the polyalkylene ether polyols include aliphatic alcohols, such as glycerol, trimethylolpropane, pentaerythritol, sorbitol, and sucrose. Organic acids such as aconitic, trimellitic, and hemimellitic may also be used. Inorganic acids such as the phosphoric acids; amines such as ethylene diamines, propylene diamines, diethylene triamine, and triisopropanolamine; phenolic compounds such as pyrogallol, dihydroxybenzoic acid, hydroxyphthalic acids; and inositol mercaptans such as 1,2,3-propane trithiol; and amides such as benzene disulfonamide are also contemplated for use in preparation of the polyurethane latices.

Any of a wide variety of organic diisocyanates may be employed in the reaction, including aromatic, aliphatic, cycloaliphatic diisocyanates, and mixtures thereof. Representative compounds include 2,4-tolylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate), and 1,5-tetrahydronaphthylene diisocyanate. Arylene diisocyanates, i.e., those in which each of the two isocyanate groups is attached directly to an aromatic ring, are preferred. In general, they react more rapidly with the active hydrogen-containing compounds than do the alkylene diisocyanates. Compounds such as 2,4-tolylene diisocyanate in which the two isocyanato groups differ in reactivity are particularly desirable. The diisocyanates may contain other substituents, although those which are free from reactive groups other than the two isocyanato groups are ordinarily preferred. In the case of the aromatic compounds, the isocyanato groups may be attached either to the same or to different rings. Dimers of the monomeric diisocyanates and di(isocyanato aryl) ureas such as di(3-isocyanato-4-methylphenyl) urea (which are the subject of U.S. Patent No. 2,757,185) may be used.

Chain extenders, other than water, which are water soluble may be used in water solutions in forming the polyurethane latices where such chain extenders react more readily wtih the isocyanates than does the water itself. Primary diamines are particularly active chain extenders which may be satisfactorily employed in preparing the latices. Other diamines that may be used as chain-extending agents for the preparation of the latices include those N-(2-hydroxypropyl)alkylene diamines as disclosed in U.S. Patent No. 3,148,173. The chain-extending agents which may be employed in the preparation of the polyurethane latices can be broadly described as those compounds having at least two functional groups bearing active hydrogen, such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer or the addition product than does water, such as phenylene diamine, 1,4-cyclohexane-bis-(methylamine), ethylene diamine, diethylene triamine, N-(2-hydroxypropyl)ethylene diamine, N,N'di(2-hydroxypropyl)-ethylene diamine, piperazine, 2-methyl-piperazine, morpholine, and dodecahydro-1,4,7,9b-tetra-azaphenaline.

Any of the well-known emulsifying agents used in the preparation of polymers may be used in preparing the latices of this invention. Those skilled in the art will easily recognize those emulsifying agents which may be used for the purpose indicated herein. The preferred emulsifying agents are the nonionic polyoxyalkylene compounds according to the formula:

as disclosed in U.S. Patent No. 2,674,619, the anionic sodium lauryl sulfate, and the cationic stearamido propyl-dimethyl-B-hydroxy ethyl ammonium phosphate.

For a more thorough discussion of the preparation of latices that may be used in preparing the reconstituted leather of this invention, reference may be had to U.S. Patent No. 2,968,575, U.S. Patent No. 3,148,173, and U.S. Patent No. 3,294,724.

Any of a large variety of scrap leather fibers that are commonly available on the market may be used in the practice of this invention. The leather scrap should be in a disintegrated state, free from large lumps and foreign material. Preferably, vegetable tanned leather scrap is used since the removal of the chromium ions from chrome tanned leather is somewhat difficult and the presence of chromium ions in some types of polyurethane latices may cause the latex solids to prematurely coagulate.

The trimming or scrap from shoe manufacturing, for example, may be used in the preparation of the shredded scrap leather fibers. The trimmings may be chopped up into relatively small pieces and put through a hammer mill. The shredded scrap leather is then removed from the hammer mill and screened to remove the leather dust.

The size of the shredded scrap leather fiber is not critical except that large amounts of fiber under 0.0625 inch (1/16") long should be avoided since it will tend to lower the tear strength of this finished material. It is preferred to use shredded scrap leather fiber having lengths in the range from 1/16 inch to 1/4 inch.

In some cases, it may be advantageous to coat the polyurethane polymeric solid bound leather sheets with a polyurethane latex coating material. In general, the latex coating materials may be made in the same manner as the polyurethane latices used to bind the shredded leather scrap. Oftentimes it is desirable to add color to the coating formulation in order to give the surface of the synthetic leather sheet a more pleasant appearance. For example, permanent black, red, orange, green, and yellow pigments may be added to the latex formulations. Thickeners are also added to the coating formulations to control the degree of penetration and to improve leveling characteristics of the latex. The thickeners that may be used include carboxy vinyl polymers and complex poly-acrylic acid emulsions. Other thickeners that may be used are well known to those skilled in the art.

The following examples will more fully illustrate the invention, but are not to be considered unduly limitative thereof.

EXAMPLES

The procedure for the preparation of the polymeric solid bound leather sheet is as follows. The calculated amount of latex was diluted with sufficient water so that when the shredded scrap leather fiber was added, the mixture had the desired solids content. Shredded scrap leather fiber was then aded to the latex mixture with gentle agitation. If unbleached kraft pulp is to be used in the formulation, it may be added at the same time as the leather fibers. As the solids content of the latex-leather-water mixture increased, the speed of agitation was increased. When all the shredded scrap leather fiber with or without the unbleached kraft pulp was added, the batch was mixed for an additional ten minutes. The preferred solids content of the mixture at this point was about 7.5%, but may vary from about 5% to 10%. The batch was then diluted with additional water (about 1,400 milliliters) to a total volume of 1,800 milliliters or a solids content of about 2.5%. If desired, a coalescing agent such as 2-pyrrolidone may be added at this point in the process. The diluted slurry of shredded scrap leather fiber-latex was then divided into six 300 milliliter portions. Polymeric solid bound leather sheets were formed, using a TAPPI sheet machine and using one-third the volume of water normally used for paper making. The sheets of scrap leather bound with polymeric solids were drained and couched in the standard manner.

A polished plate and blotter were placed on each sheet, and a pack of six sheets were pressed at about 50 p.s.i. for five minutes. The blotters were stripped from the sheets, and the sheets were placed in drying rings and air dried at 150° F. The sheets were then removed from the rings and cured at about 250° F. for about twenty-five minutes.

The cured samples were then ready for physical testing or for a further coating treatment.

COATING OF POLYURETHANE RECONSTITUTED LEATHER

The surface coating latex compound was prepared by placing the required amount of latex in a container. The necesary amount of pigments was added to the container and agitation was started. When the mixture was thoroughly blended, a thickening agent was added and the resulting mixture agitated until a smooth mixture was obtained.

A weighed sheet of polyurethane reconstituted leather was taped to a glass-coating plate, and the coating mixture was added as for paper and fabric coating. The coating was leveled with a Mayer wire wound rod. The coated sheets were then cured for about 20 minutes at about 250° F. The cured coated reconstituted leather sheets were allowed to cool and then weighed to determine the amount of coating.

TESTING OF COATED AND UNCOATED RECONSTITUTED LEATHER SHEETS

Abrasion test

Sample were cut to size and weight. The abrasion tests were made with a Taber Abraser equipped with CS17 wheels, using a 500 gm deadweight loading and 1,000 cycles. The tested samples were reweighed and the loss in weight is calculated as percent abrasion. Results are shown in Tables II, IV, and VIII.

Tear test

A standard tear specimen (63 mm. wide) was cut from each sheet to be tested. Five tears were made, using an Elmendorf tear tester. The average of these tests was converted to the tear for a standard length specimen. The results are reported as tear in grams. Results are shown in Table II.

Tensile test

Tensile specimens were cut ½-inch wide. The tensile tests were run in a Scott and an Instron tensile tester. Test values were average. The results were reported in pounds per inch of width (lbs./in.) and pounds per square inch (lbs./in.$^2$). Results are shown in Tables II, IV, and VIII.

Flex test

Flex specimens were flexed on a Newark leather flex tester until the first cracks were noted on the surface. Results are shown in Tables IV and VIII.

Moisture vapor transmission rate (M.V.T.)

Moisture vapor transmission tests were run according to TAPPI Standard T448$_m$–49. Results are shown in Tables IV and VIII.

DESCRIPTION OF POLYURETHANE LATICES

The latices used in preparing the polyurethane polymeric solid bound leather sheets in the examples shown hereafter are more fully defined as follows:

Latex "A"

The polyalkylene ether polyols used in the preparation of this latex were a blend of polyoxypropylene glycols having molecular weights of about 1,300 and 600. These polypropylene glycols were blended to yield an active hydrogen-containing compound having an average molecular weight of about 1,200. The prepolymer was made by reacting the above-described blend of polyols with toluene diisocyanate in such a proportion that the NCO/OH ratio was 2.0/1. The prepolymer was then chain extended with an appropriate amount of 2-methylpiperazine in an aqueous solution. Latex "A" has a solid content of about 40%. The emulsification system comprised about three parts of the compound of the formula $$HO(C_2H_4O)_a(C_3H_6O)_b(C_2H_4O)_a$$

having a molecular weight of about 15,500 and an 80% ethylene oxide content in about 70 parts of deionized water.

Latex "B"

The polyolakylene ether polyols used in the preparation of this latex were a blend of polypropylene glycol having molecular weights of about 700 and 400 blended to an average molecular weight of about 675. The prepolymer was prepared from this blend of polypropylene glycols by reacting the blend with toluene diisocyanate in an NCO/OH ratio of about 1.5/1. The prepolymer was then chain extended in an aqueous medium with an appropriate amount of 2-methylpiperazine. In both Latex "A" and "B," the appropriate amount of 2-methylpiperazine was about 95% of the theoretical 2-methylpiperazine based on the actual free NCO groups. The emulsification system was the same as described for Latex "A."

Latex "C"

The polyether component of the prepolymer for the preparation of Latex "C" consisted of one mole of a polyoxypropylene triol with a molecular weight of about 6,100 and about two moles of a polyoxypropylene derivative of bisphenol A having a molecular weight of about 650. The blend of tri- and di-hydroxy functional materials was then reacted with toluene diisocyanate in a ratio such that the NCO/OH ratio was 2/1. The prepolymer formed was then reacted with 100% of the theoretical 2-methylpiperazine required, based on the actual free NCO groups. Three parts of sodium lauryl sulfate in 70 parts of deionized water was used as the emulsification system in this latex.

Latex "D"

The prepolymer for the preparation of Latex "D" was prepared by reacting toluene diisocyanate with a tri-functional polyoxypropylene compound derived from tri-methylolpropane and having a molecular weight of about 6,100. The NCO/OH ratio was 2/1. The prepolymer was chain extended in an aqueous solution with 95% of the theoretical amount of 2-methylpiperazine. The emulsification system used in Latex "D" was the same as used in Latex "C."

Latex "E"

This latex has essentially the same composition as Latex "C" except that the emulsification system comprised about three parts stearamido propyldi-methyl-B-hydroxy ethyl ammonium phosphate in about 70 parts of deionized water.

Latex "F"

The prepolymer used in Latex "F" was prepared from a polyoxypropylene derivative of tri-methylolpropane having a molecular weight of about 750. The polyoxypropylene derivative of tri-methylolpropane was was reacted with toluene diisocyanate in an NCO/OH ratio of 2/1. The prepolymer was then chain extended with the requisite amount of 2-methylpiperazine. The same emulsification system as described under Latex "A" was used.

Latex "G"

Latex "G" was a blend of two separate polyurethane latices. Latex "G" was a 75 to 25 proportion of Latex "E" prepared as described above and a latex prepared from a prepolymer made by reacting toluene diisocyanate with a polypropylene polyol blend having an average molecular weight of about 550. The blend of polypropylene polyols was made from a polypropylene glycol having molecular weights of about 600 or 700 and a polypropylene glycol having a molecular weight of about 400. The prepolymer was then chain extended with 100% of the theoretical amount of 2-methylpiperazine as required.

Latex "H"

The polyether component of the prepolymer for the preparation of Latex "H" consisted of about one mole of a polyoxypropylene derivative of glycerol having a molecular weight of about 3,000 and about two moles of a polyoxypropylene derivative of bisphenol A having a molecular weight of about 675. The blend of polyether polyol components was reacted with an excess toluene diisocyanate to form the prepolymer. The prepolymer was then chain extended in an aqueous solution with a mixture of 80% 2-methylpiperazine and 20% morpholine, based on weight of the mixture of the chain extenders. The emulsification system was the same as the emulsification system described for Latex "A."

Latex "J"

This latex had essentially the same composition as Latex "D" except the emulsification system used was the same as the emulsification system described under Latex "A."

Latex "K"

Latex "K" was prepared from a prepolymer made by reacting an excess of toluene diisocyanate with a polypropylene polyol blend having an average molecular weight of about 550. The blend of polypropylene polyols was made from polypropylene glycols having a molecular weight of about 600 or 700 and a polypropylene glycol having a molecular weight of about 400. The prepolymer was chain extended with N-(2-hydroxypropyl)ethylene diamine. The same emulsification system as described in Latex "A" was used.

The tables below show the formulations and the results of the physical tests.

TABLE I.—FORMULATIONS FOR RECONSTITUTED LEATHER

| Ex. No. | Latex | Grams Leather | Grams Latex Solids | Grams 2-pyrrolidone | Mixing Conditions Time Minutes | Consistency, percent |
|---|---|---|---|---|---|---|
| 1 | B | 30 | 15.0 | 3.0 | 10 | 7.5 |
| 2 | E | 30 | 15.0 | 3.0 | 10 | 7.5 |
| 3 | E | 30 | 22.5 | 4.5 | 10 | 7.5 |
| 4 | E | 30 | 30.0 | 6.0 | 10 | 7.5 |
| 5 | E | 30 | 45.0 | 9.0 | 10 | 7.5 |
| 7 | D | 30 | 15.0 | 3.0 | 10 | 7.5 |
| 8 | D | 30 | 22.5 | 4.5 | 10 | 7.5 |
| 9 | D | 30 | 30.0 | 6.0 | 10 | 7.5 |
| 10 | G | 30 | 15.0 | 3.0 | 10 | 7.5 |
| 11 | G | 30 | 22.5 | 4.5 | 10 | 7.5 |
| 12 | G | 30 | 30.0 | 6.0 | 10 | 7.5 |

TABLE I-A

Coating formulation for reconstituted leather

| Component: | Parts |
|---|---|
| Latex "B" | 100.0 |
| 2-pyrrolidone | 10.0 |
| Thickener (carboxy vinyl polymer) | 0.5 |
| Yellow pigment | 3.0 |
| Permanent red pigment | 3.0 |
| Permanent black pigment | 1.0 |

TABLE II.—PROPERTIES OF UNCOATED AND COATED RECONSTITUTED LEATHER

| Example* No. | Sheet No. | Weight, Ounces/Yd.² Uncoated | Coated | Coating | Thickness in Inches Uncoated | Wear, Cycles | Abrasion Loss, Percent Uncoated | Coated | Uncoated Stock Tear in Grams | Tensile Lbs./In. |
|---|---|---|---|---|---|---|---|---|---|---|
| 1 | 1 | 15.82 | | | | 1,000 | 1.7 | | | |
|   | 2 | 16.08 | | | | | | | | |
| 2 | 1 | 9.59 | 9.92 | 0.33 | | 1,000 | | 4.7 | | |
|   | 2 | 9.91 | 10.03 | 0.12 | | | | | | |
|   | 3 | 9.87 | | | 0.019 | 1,000 | 8.1 | | 208 | 16.8 |
| 3 | 1 | 9.21 | 9.42 | 0.21 | | 1,000 | | 6.6 | | |
|   | 2 | 9.98 | 10.34 | 0.36 | | | | | | |
|   | 3 | 8.54 | | | 0.019 | 1,000 | 11.8 | | 176 | 14.2 |
| 4 | 1 | 12.44 | 12.67 | 0.23 | | 1,000 | | 3.5 | | |
|   | 2 | 13.23 | 13.34 | 0.11 | | | | | | |
|   | 3 | 12.91 | | | 0.023 | 1,000 | 5.7 | | 208 | 22.4 |
| 5 | 1 | 18.40 | 18.46 | 0.06 | | 1,000 | | 2.8 | | |
|   | 2 | 15.85 | 16.02 | 0.17 | | | | | | |
|   | 3 | 15.68 | | | 0.028 | 1,000 | 7.2 | | 224 | 15.2 |
| 7 | 1 | 8.59 | 9.07 | 0.48 | | 1,000 | | 6.8 | | |
|   | 2 | 9.13 | 9.49 | 0.36 | | | | | | |
|   | 3 | 9.41 | | | 0.018 | 1,000 | 10.7 | | 160 | 12.2 |
| 8 | 1 | 11.49 | | | 0.021 | 1,000 | 5.5 | | 160 | 10.2 |
|   | 2 | 12.40 | 12.87 | 0.47 | | 1,000 | | 4.5 | | |
|   | 3 | 11.01 | 11.44 | 0.43 | | 1,000 | | 6.5 | | |
| 9 | 1 | 11.19 | 11.72 | 0.53 | | | | | | |
|   | 2 | 12.65 | 13.40 | 0.75 | | | | | | |
|   | 3 | 12.83 | | | 0.021 | 1,000 | 11.9 | | 208 | 9.0 |
| 10 | 1 | 9.60 | 10.41 | 0.81 | | 1,000 | | 2.8 | | |
|   | 2 | 9.93 | 10.55 | 0.62 | | | | | | |
|   | 3 | 9.81 | | | 0.018 | 1,000 | 6.0 | | 112 | 9.2 |
| 11 | 1 | 10.99 | 11.70 | 0.71 | | 1,000 | | 2.7 | | |
|   | 2 | 10.68 | 11.34 | 0.66 | | | | | | |
|   | 3 | 10.60 | | | 0.021 | 1,000 | 2.7 | | 176 | 16.0 |
| 12 | 1 | 13.63 | | | 0.025 | 1,000 | 3.2 | | | |
|   | 2 | 13.34 | 15.57 | 2.23 | | | | | | |
|   | 3 | 13.66 | 15.69 | 2.03 | | 1,000 | | 2.3 | 224 | 23 |

*Formulations as shown in Table I.

TABLE III.—FORMULATIONS FOR RECONSTITUTED LEATHER

| Example No. | Latex | Grams Leather | Grams Latex Solids | Grams 2-pyrrolidone | Grams Color Added |
|---|---|---|---|---|---|
| 13 | B | 30.0 | 15.0 | 3.0 | 0. |
| 14 | B | 30.0 | 30.0 | 3.0 | 0. |
| 15 | C | 30.0 | 15.0 | 3.0 | 0. |
| 16 | C | 30.0 | 30.0 | 3.0 | 0. |
| 17 | A | 30.0 | 15.0 | 3.0 | 0. |
| 18 | A | 30.0 | 30.0 | 3.0 | 0. |
| 19 | C | 60.0 | 30.0 | 6.0 | 5 gms. P.R.[1] |
| 20 | C | 60.0 | 30.0 | 6.0 | 5 gms. P.R.[1] * |
| 21 | B | 60.0 | 30.0 | 6.0 | 5 gms. C.O.[2] |
| 22 | B | 60.0 | 30.0 | 6.0 | 5 gms. C.O.[2] |
| 23 | D | 60.0 | 30.0 | 6.0 | 5 gms. H.G.[3] |
| 24 | D | 60.0 | 30.0 | 6.0 | 5 gms. H.G.[3] * |
| 25 | C | 30.0 | 15.0 | 3.0 | 5 gms. ACB.[4] |
| 26 | C | 45.0 | 27.5 | 4.5 | 5 gms. ACB.[4] |
| 27 | C | 30.0 | 30.0 | 3.0 | 5 gms. ACB.[4] |
| 28 | C | 45.0 | 45.0 | 4.5 | 5 gms. ACB.[4] |

* 10 gms. TiO₂ included in formulation.
[1] P.R.=Permagen Red Pigment.
[2] C.O.=Dispersed Cadmium Orange Pigment.
[3] H.G.=Heliogen Green Pigment.
[4] ACB=Dispersed Carbon Black.

TABLE IV.—PHYSICAL PROPERTIES—RECONSTITUTED LEATHER

| Example * No. | Latex | Caliper, In. | M.V.T.** gm./m.²/24 hrs. | Flex, Cycles | Abrasion Loss, percent | Tensile Lb./In.² |
|---|---|---|---|---|---|---|
| 13 | B | .019 | | 397,610 | 0.000 | 1,820 |
| 14 | B | | | 167,300 | 0.008 | 1,813 |
| 15 | C | | | 1,005,297 | 0.000 | 1,101 |
| 16 | C | | | 1,005,000 | 0.004 | 1,583 |
| 17 | A | .024 | | 237,399 | 0.018 | 1,613 |
| 18 | A | | | 209,294 | 0.000 | 1,645 |
| 19 | C | | | 2,347 | | |
| 20 | C | .035 | | 361,703 | | |
| 21 | B | | 575.0 | 4 | | |
| 22 | B | .040 | 748.6 | 200,900 | | |
| 23 | D | | 742.1 | 385,488 | 2.950 | |
| 24 | D | | 819.7 | 1,049,330 | 1.760 | |
| 25 | C | .019 | | 528,331 | 1.830 | |
| 26 | C | .027 | | 420,754 | 1.460 | |
| 27 | C | .021 | | 507,524 | 0.780 | |
| 28 | C | .034 | | 597,772 | 0.720 | |
| Leather | | .040 | 1,193.9 | | 2.500 | |

*Formulations as shown in Table III.
**Moisture Vapor Transmission Rate.

TABLE V

Water absorption properties

Several samples were exposed for 96 hours to a 95% relative humidity atmosphere and the moisture pickup determined. This test was designed to simulate the moisture pickup properties of regular leather such as are encountered in footwear.

| Example * No. | Latex | Pickup, percent |
|---|---|---|
| Leather | None | 5.00 |
| 23 | D | 5.94 |
| 17 | A | 10.24 |
| 20 | C | 10.48 |
| 22 | B | 10.50 |

*Formulations as shown in Table III.

TABLE VI.—FORMULATIONS FOR RECONSTITUTED LEATHER

| Components (In weight percent) | Example No. | | | |
|---|---|---|---|---|
| | 29 | 30 | 31 | 32 |
| Shredded Leather Fiber | 23.3 | 35.0 | 23.3 | 23.3 |
| Unbleached Kraft Pulp | 23.3 | 11.7 | 23.3 | 23.3 |
| Latex "J" | 46.7 | 46.5 | | |
| Latex "K" | | | 46.7 | 46.7 |
| Emulsifier A ¹ | 6.7 | | | |
| Emulsifier B ² | | 6.6 | 6.6 | 6.6 |

¹ Compound of formula $HO(C_2H_4O)_a(C_3H_6O)_b(C_2H_4O)_aH$, molecular weight about 3,800, ethylene oxide content about 10%.
² Compound of formula $HO(C_2H_4O)_a(C_3H_6O)_b(C_2H_4O)_aH$, molecular weight about 3,500, ethylene oxide content about 20%.

TABLE VII.—COATING FORMULATION FOR RECONSTITUTED LEATHER

| Components (parts by weight) | Used on | |
|---|---|---|
| | Example No. 29 | Example No. 30 |
| Latex "K" | | 100.0 |
| Latex "J" | 20.0 | |
| Latex "H" | 80.0 | |
| Polyacrylic Acid Emulsion | 1.4 | 1.6 |
| Dispersed Carbon Black | 2.0 | 2.0 |
| Sodium Hydroxide | 0.3 | 0.3 |

TABLE VIII.—PHYSICAL PROPERTIES

| Test | Example No. 29 | | Example No. 30 | |
|---|---|---|---|---|
| | Uncoated | Coated | Uncoated | Coated |
| Abrasion Loss: | | | | |
| Mgm, loss | 122.0 | 30.0 | 127.00 | 10.00 |
| Percent loss | 2.1 | 2.1 | 0.43 | 0.13 |
| M.V.T.* gms./m.² 24 hrs | 197.0 | 72.8 | 31.00 | 21.20 |
| Cycles, Newark Flex-Tester | <25,000.0 | <25,000.0 | <25,000.0 | <25,000.0 |
| Tensile Tests: | | | | |
| Pounds/in | 66.0 | 70.0 | 47.20 | 57.20 |
| Pounds/in.² | 1,888.0 | 2,002.0 | 1,350.00 | 1,636.00 |

*Moisture vapor transmission rate.

What is claimed is:

1. A reconstituted leather sheet comprising shredded leather fiber bonded together by polyurethane polymeric solids wherein said polymeric solids are formed by chain-extending an isocyanate-terminated prepolymer with a chain-extending agent, said chain-extending agent being an organic compound having at least two active hydrogen atoms.

2. The composition of claim 1 wherein said shredded leather fiber comprises from about 35% to 70% by weight of said sheet and said polymeric solids comprise from about 65% to 30% by weight of said sheet, based on total weight of said fiber and said polymeric solids.

3. The composition of claim 1 wherein said prepolymer is the reaction product of an organic compound having a molecular weight of at least 300, selected from polyalkylene ether polyols, poly(alkylene ether-alkylene thioether) glycols, alkyd resins containing hydroxyl or carboxyl end groups, esters of polyhydric alcohols and hydroxy fatty acids, and polyester amide resins with a stoichiometric excess of an organic diisocyanate.

4. The composition of claim 3 wherein said organic compound is a polyoxyalkylene ether polyol.

5. The composition of claim 3 wherein said chain-extending agent is selected from primary diamines, secondary diamines, and mixtures thereof.

6. The composition of claim 2 which includes from about 10% to 30% by weight of unbleached kraft pulp, based on the total weight of said fiber, polymeric solids, and unbleached kraft pulp.

7. The reconstituted leather sheet of claim 1 having a cured polyurethane coating thereon.

8. The process of producing a reconstituted leather sheet comprising the steps of
   (1) forming an aqueous slurry of shredded leather fiber and polyurethane polymeric solids,
   (2) forming the slurry into a sheet,
   (3) removing the water from said sheet, and
   (4) curing the polymeric solids,
whereby an adherent integrated network of shredded leather fiber and cured polymeric solids is formed.

9. The process of claim 8 wherein said slurry contains from about 1.5% to 4.0% by weight solids and the balance is water.

10. The process of claim 9 wherein the solids content of said slurry comprises from about 35% to 70% by weight shredded leather fiber and from about 65% to 30% by weight polymeric solids, based on total weight of solid in said slurry; wherein said polymeric solids are the reaction product of an isocyanate-terminated prepolymer and an organic chain-extending agent having at least two active hydrogen atoms.

11. The process of claim 10 wherein from about 10% to 30% by weight, based on total solids content of said slurry, of an unbleached kraft pulp is included in said solids content.

References Cited
UNITED STATES PATENTS

| | | | |
|---|---|---|---|
| 2,601,671 | 6/1952 | Wilson | 162—151 |
| 3,051,612 | 8/1962 | Bennett | 162—151 |
| 3,116,200 | 12/1963 | Young | 162—151 |
| 3,294,724 | 12/1966 | Axelrood | 260—29.2 |
| 3,374,051 | 3/1968 | Garber | 8—94.21 |
| 3,419,533 | 12/1968 | Dieterich | 260—75 X |

HOWARD R. CAINE, Primary Examiner

U.S. Cl. X.R.

8—94.21; 106—287; 162—168